(12) United States Patent
Tian et al.

(10) Patent No.: US 12,421,455 B1
(45) Date of Patent: Sep. 23, 2025

(54) METHOD AND DEVICE FOR REGULATING WASTE ORGANIC POLYMER MATERIAL PYROLYSIS PRODUCTS

(71) Applicant: Qingdao University of Science and Technology, Qingdao (CN)

(72) Inventors: Xiaolong Tian, Qingdao (CN);
Chuansheng Wang, Qingdao (CN);
Kongshuo Wang, Qingdao (CN)

(73) Assignee: Qingdao University of Science and Technology, Qingdao (CN)

( * ) Notice: Subject to any disclaimer, the term of this patent is extended or adjusted under 35 U.S.C. 154(b) by 0 days.

(21) Appl. No.: 19/173,859

(22) Filed: Apr. 9, 2025

(30) Foreign Application Priority Data

Aug. 9, 2024 (CN) .......................... 202411090695.7

(51) Int. Cl.
| | |
|---|---|
| *C10G 1/02* | (2006.01) |
| *B01J 8/00* | (2006.01) |
| *B01J 8/08* | (2006.01) |
| *B01J 8/10* | (2006.01) |
| *C10B 47/44* | (2006.01) |
| *C10B 53/07* | (2006.01) |
| *C10B 57/06* | (2006.01) |

(52) U.S. Cl.
CPC .............. *C10G 1/02* (2013.01); *B01J 8/0045* (2013.01); *B01J 8/087* (2013.01); *B01J 8/10* (2013.01); *C10B 47/44* (2013.01); *C10B 53/07* (2013.01); *C10B 57/06* (2013.01); *B01J 2208/00398* (2013.01); *B01J 2208/00415* (2013.01); *B01J 2208/00504* (2013.01); *B01J 2208/00769* (2013.01); *C10G 2300/1003* (2013.01)

(58) Field of Classification Search
CPC .. C10G 1/02; C10G 2300/1003; C10B 53/07; C10B 57/06; C10B 47/44; B01J 8/10; B01J 8/087; B01J 8/0045; B01J 2208/00504; B01J 2208/00769; B01J 2208/00415; B01J 2208/00398
See application file for complete search history.

(56) References Cited

U.S. PATENT DOCUMENTS

| 11,945,998 B2 * | 4/2024 | Bitting | ................... B01J 19/243 |
| 12,291,675 B2 * | 5/2025 | Simell | ................... B01J 23/002 |

(Continued)

*Primary Examiner* — Youngsul Jeong
(74) *Attorney, Agent, or Firm* — Bayramoglu Law Offices LLC

(57) ABSTRACT

A method and a device for regulating waste organic polymer material pyrolysis products are provided. Waste organic polymer materials are uniformly mixed with a composite auxiliary agent for removing harmful elements at a mass ratio of 90:10 and subjected to pyrolysis at 400-450° C. Resulting primary pyrolysis products are brought into contact with catalysts and placed at a temperature of 550-800° C. to obtain pyrolysis products. The invention reduces the sulfur and chlorine content in pyrolysis oil products by more than 85%. Through the reverse flow of the waste organic polymer materials relative to the catalysts during pyrolysis, and the regulation of catalyst temperature, the invention achieves increased production of low-carbon olefins and aromatics in the pyrolysis products, significantly improving the economic value of the pyrolysis products and promoting technological innovation in the pyrolysis industry for materials such as waste rubber and waste plastic.

12 Claims, 8 Drawing Sheets

(56) References Cited

U.S. PATENT DOCUMENTS

| | | | | |
|---|---|---|---|---|
| 2014/0073823 A1* | 3/2014 | Hughes | ................... | C10B 53/02 |
| | | | | 585/240 |
| 2021/0130700 A1* | 5/2021 | Wu | ......................... | C10G 1/10 |
| 2023/0332051 A1* | 10/2023 | Gillis | ....................... | C10G 1/10 |

* cited by examiner

METHOD AND DEVICE FOR REGULATING WASTE ORGANIC POLYMER MATERIAL PYROLYSIS PRODUCTS

CROSS-REFERENCE TO THE RELATED APPLICATIONS

This application is based upon and claims priority to Chinese Patent Application No. 202411090695.7 filed on Aug. 9, 2024, the entire content of which is incorporated herein by reference.

TECHNICAL FIELD

The invention belongs to the field of solid waste recycling technology, especially in the recycling of waste organic polymer materials, and particularly relates to a method and device for regulating waste organic polymer material pyrolysis products.

BACKGROUND

Pyrolysis is an effective way to recycle waste organic polymer materials. Currently, the industrial pyrolysis methods for waste rubber, waste plastic, and other waste organic polymer materials mainly use rotary kilns. This involves placing waste organic polymer materials into a pyrolysis reactor and applying a certain temperature to facilitate decomposition. However, because the decomposition of waste organic polymer materials is chaotic, the quality of pyrolysis products is generally poor, particularly in terms of the quality of pyrolysis oil products. To improve the quality of pyrolysis oil products, the industry has started to put waste organic polymer materials and catalysts into a pyrolysis reactor together, and apply a certain temperature to facilitate decomposition. This method is called catalytic pyrolysis, which enhances the quality of pyrolysis oil products under the influence of catalysts. However, this catalytic pyrolysis method also presents several challenges.

(1) There is a significant difference between the decomposition temperature of waste organic polymer materials and the temperature at which catalysts exhibit the best activity. In the industrial pyrolysis process, waste organic polymer materials and catalysts are placed together; if the decomposition temperature of the waste organic polymer materials is prioritized, the catalyst activity will not reach its optimum; conversely, if the optimal temperature for catalyst activity is prioritized, the waste organic polymer materials will undergo severe fragmentation, producing a large amount of pyrolysis gas and significantly reducing the yield of pyrolysis oil products.

(2) Waste organic polymer materials, such as waste rubber and waste plastic, contain a large number of harmful elements. For example, waste rubber contains sulfur, and PVC in waste plastic contains a significant amount of chlorine. During the pyrolysis process, sulfur and chlorine are released as the organic materials decompose, forming new chlorinated and sulfated compounds. These compounds can reduce the quality of the pyrolysis oil products, poison the catalysts, and cause corrosion of pyrolysis equipment, among other issues.

To address the issues of reduced quality of pyrolysis oil products and catalyst poisoning in the current catalytic pyrolysis methods, the invention has developed a method and device for regulating pyrolysis products from industrial continuous pyrolysis of waste organic polymer materials.

SUMMARY

The invention aims to address the aforementioned issues present in the prior art and proposes a method and device for regulating waste organic polymer material pyrolysis products. By adding a composite auxiliary agent for removing harmful elements during the pyrolysis process, sulfur, chlorine, and other harmful elements are immobilized within the composite auxiliary agent, achieving preliminary regulation of gaseous pyrolysis products; the gaseous pyrolysis products then react with catalysts maintained at the optimal activity temperature, further regulating the quality of the gaseous pyrolysis products; meanwhile, throughout the entire pyrolysis process, waste organic polymer materials and the catalysts move in opposite directions, maximizing the contact time between the catalysts and the gaseous pyrolysis products. This improves the yield of pyrolysis oil products and also addresses the issue of harmful elements affecting the quality of the pyrolysis products.

The technical scheme adopted by the invention is as follows.

The invention separates the two key processes of waste organic polymer material pyrolysis and product regulation. The "waste organic polymer material pyrolysis temperature" and the "product regulation temperature" are set based on the decomposition temperature of the waste organic polymer materials and the optimal temperature for catalyst activity respectively. To further improve the quality of the pyrolysis products, the invention integrates the pyrolysis of the waste organic polymer materials with the process of removing harmful elements based on the specific composition of the waste organic polymer materials.

Based on this, the invention provides a method for regulating waste organic polymer material pyrolysis products, including the following steps:

(1) uniformly mixing waste organic polymer materials with a composite auxiliary agent for removing harmful elements in a mass ratio of 90:10, and placing the mixture under a waste organic polymer material pyrolysis temperature of 400-450° C., allowing the waste organic polymer materials to decompose into primary pyrolysis products; here, since the waste organic polymer materials are mixed with the composite auxiliary agent for removing harmful elements, the primary pyrolysis products first come into contact with the composite auxiliary agent for removing harmful elements, allowing sulfur and chlorine compounds in the primary pyrolysis products to fully react and neutralize with the composite auxiliary agent for removing harmful elements, thereby reducing the sulfur and chlorine content in pyrolysis oil products by over 85%; the waste organic polymer material pyrolysis temperature of 400-450° C. is controlled by a pyrolysis reactor heat supply device, and any temperature value within this range, such as 400° C., 410° C., 420° C., 430° C., 440° C., or 450° C., is applicable, along with other unlisted values within this range;

(2) separating the waste organic polymer materials mixed with the composite auxiliary agent for removing harmful elements from catalysts, positioning the same in a layered arrangement with the catalysts on top and the mixture of the waste organic polymer materials and the composite auxiliary agent for removing harmful elements on the bottom, ensuring that the materials in the upper and lower layers move in opposite directions to maintain a countercurrent flow, allowing the primary pyrolysis products, after reacting with the composite auxiliary agent for removing harmful elements, to fully contact the catalysts, placing under a product regulation temperature of 550-800° C., and regulating the generation process of target products (low-carbon olefins and aromatics) under the influence of the catalysts, resulting in a high content of aromatic-rich final pyrolysis products, significantly enhancing the content of valuable chemical raw materials in the pyrolysis products;

here, the product regulation temperature of 550-800° C. is adjusted on top of the internal temperature of the pyrolysis reactor, utilizing an electric heating auxiliary temperature control system (composed mainly of electric heating coils) located at the bottom of a base plate to fine-tune the temperature of the material in the upper layer (the catalysts), ensuring that it reaches the optimal activity temperature for the catalysts and catalytic pyrolysis occurs at the best temperature. Any temperature value within the range of 550-800° C., such as 550° C., 600° C., 650° C., 700° C., 750° C., or 800° C., is applicable, along with other unlisted values within this range.

The catalysts are any one or a mixture of several selected from refinery waste catalyst, fly ash, and red mud, and the composite auxiliary agent for removing harmful elements is an alkaline component primarily composed of red mud.

In steps (1) and (2) described above, the composite auxiliary agent for removing harmful elements being separated from the catalysts during the pyrolysis of the waste organic polymer materials such as waste rubber and waste plastic refers to that the waste organic polymer materials such as waste rubber and waste plastic and the composite auxiliary agent for removing harmful elements are located at the bottom of the pyrolysis reactor, while the catalysts are positioned above the waste organic polymer materials such as waste rubber and waste plastic, facilitating the ex-situ catalytic pyrolysis of the waste organic polymer materials such as waste rubber and waste plastic.

To further enhance the contact time and extent between the primary pyrolysis products and the catalysts in step (2), the movement directions of the catalysts and the materials at the bottom of the pyrolysis reactor (the waste organic polymer materials such as waste rubber and waste plastic and the composite auxiliary agent for removing harmful elements) are controlled, making the two move in opposite directions during the pyrolysis process.

Further, the catalysts and the mixture of the waste organic polymer materials and the composite auxiliary agent for removing harmful elements are placed in a pyrolysis reactor in a layered arrangement, and the movement direction is controlled to ensure that the catalysts in the upper layer and the mixture of the waste organic polymer materials and the composite auxiliary agent for removing harmful elements in the lower layer move in opposite directions during the pyrolysis process, enabling ex-situ catalytic pyrolysis.

The ex-situ catalytic pyrolysis refers to that with the arrangement where the waste organic polymer materials and the composite auxiliary agent for removing harmful elements are located at the bottom of the pyrolysis reactor, while the catalysts are positioned above the waste organic polymer materials, ex-situ catalytic pyrolysis of the waste organic polymer materials is realized, where the movement directions of the catalysts and the waste organic polymer materials are opposite during pyrolysis, thereby enhancing the catalytic pyrolysis effect of the catalysts.

The waste organic polymer materials include waste rubber and waste plastic; when the waste organic polymer material is waste rubber, the mass ratio of refinery waste catalyst, fly ash, and red mud is 60:30:10; and when the waste organic polymer material is waste plastic, the mass ratio of refinery waste catalyst, fly ash, and red mud is 45:40:15.

The catalysts used in the invention are low-cost composite catalysts primarily prepared from waste catalysts from petroleum processing, and the main components are a mixture of refinery waste catalyst, fly ash, and red mud.

Further, during the pyrolysis process, the harmful elements in the waste organic polymer materials react with the composite auxiliary agent for removing harmful elements, leading to immobilization of the harmful elements into the composite auxiliary agent for removing harmful elements, and the harmful elements include sulfur, chlorine, and silicon;

the composite auxiliary agent for removing harmful elements also contains alkaline substances and a binder, and the alkaline substances include calcium oxide, calcium carbonate, dolomite, magnesium oxide, sodium carbonate, and mordenite; and the composite auxiliary agent for removing harmful elements is prepared through mixing and granulation of the following components by weight: 20-25 parts of red mud, 15-20 parts of calcium oxide, 10 parts of calcium carbonate, 5-10 parts of dolomite, 5-10 parts of magnesium oxide, 10-15 parts of sodium carbonate, 10-15 parts of mordenite, and 5 parts of binder.

The composite auxiliary agent for removing harmful elements is used to neutralize harmful elements such as sulfur, chlorine, and silicon in the pyrolysis products. The composite auxiliary agent for removing harmful elements is primarily based on red mud, supplemented with a certain proportion of alkaline substances including calcium oxide, calcium carbonate, dolomite, magnesium oxide, sodium carbonate, and mordenite, along with a certain amount of binder, which are mixed and granulated according to specific weight proportions.

The optimal formulations are as follows: 20 parts of red mud, 15 parts of calcium oxide, 10 parts of calcium carbonate, 10 parts of dolomite, 10 parts of magnesium oxide, 15 parts of sodium carbonate, 10 parts of mordenite, and 5 parts of binder; or alternatively: 25 parts of red mud, 20 parts of calcium oxide, 10 parts of calcium carbonate, 5 parts of dolomite, 5 parts of magnesium oxide, 10 parts of sodium carbonate, 15 parts of mordenite, and 5 parts of binder.

The invention further provides a device for implementing the method as described above, including a main pyrolysis reactor system, wherein the main pyrolysis reactor system includes a catalyst dosing device, a pyrolysis furnace vessel, and a catalyst self-circulating device arranged inside the vessel in an inclined manner; the catalyst self-circulating device includes a screw, a base plate, and a screw drive system, and an electric heating coil is installed at a bottom of the base plate; and the screw features a hollow structure inside, with spiral configurations on both inner and outer surfaces that are oriented in opposite directions, and a spiral angle inside is 5%-10% greater than that on the outer surface.

Further, a tail of the screw is a spiral blade structure, while the rest of the screw is a spiral ridge structure; a thickness of the spiral blade is ⅕-⅓ of a thickness of the spiral ridge, and a rotational curvature of the spiral blade is 3-4 times that of the spiral ridge; a gap between the spiral ridge and the base plate is 1-3 mm, and an inclination angle of the base plate is 3-7°; and the base plate is fixedly installed inside the pyrolysis furnace vessel in a configuration that is higher on the left and lower on the right in an axial direction.

Further, catalysts are used repeatedly through the catalyst self-circulating device, with the specific steps as follows: the catalysts input through the catalyst dosing device move upwards under the driving force of the screw until the catalysts reach a top of the base plate; as the catalysts gradually accumulate, the catalysts are scooped into the hollow interior of the screw by the spiral blades at the tail of the screw; under the action of self weight and the spiral ridges inside the screw, the catalysts move downwards to a bottom of the base plate at a certain speed and flow out from an outlet at a head of the hollow screw; this process is repeated to achieve self-circulation of the catalysts during the pyrolysis process; and the catalyst self-circulating device has only one power source, which is a motor device, the motor drives the screw to rotate, which in turn drives the catalysts to move upwards, and the catalysts are then scooped into the hollow interior of the screw by the spiral blades at the tail of the screw, and move downwards under the action of self weight and the spiral ridges inside the screw.

Further, the main pyrolysis reactor system includes pyrolysis furnace sealing devices, a drive gear, a chain drive system, and a catalyst discharge device; the chain drive system drives the drive gear, which then transfers power to the pyrolysis furnace vessel to enable the same to rotate at a constant speed; the pyrolysis furnace sealing devices are installed at both ends of the pyrolysis furnace vessel and are used to keep the rotating pyrolysis furnace vessel sealed; and the catalyst discharge device is connected to the pyrolysis furnace vessel and is used to discharge the catalysts.

Further, a center of the base plate is concave, forming a groove structure; a plurality of circular holes are formed in an upper part of an inner side wall of the groove; when a particle size of the catalysts is less than 10 nm, a size of the circular holes is 3-6 mm; when the particle size of the catalysts is greater than 100 nm, the size of the circular holes is 5-9 mm;

two sides of the base plate are flat structures, and rectangular slots are formed in the flat structures; and a length of the rectangular slots is 1/5-1/4 of a width of the base plate, and a width of the rectangular slots is 2-5 mm.

Further, the pyrolysis furnace sealing device includes a pyrolysis furnace side wall and a U-shaped sealing rotating ring; the sealing rotating ring is interference-fitted with the screw, and a sealing working plane of the sealing rotating ring protrudes 1-2 mm beyond a working surface of the screw; a portion of the pyrolysis furnace side wall that fits with the sealing rotating ring is equipped with an upper static seal ring and a lower static seal ring, both of which are circular; the upper static seal ring is 10 mm longer than the lower static seal ring; a sealing gasket is provided between the sealing rotating ring and the upper and lower static seal rings; and the pyrolysis furnace sealing device also includes a lubricant port.

Further, the device also includes a feeding system, a combustion heat supply system, and a pyrolysis residue conveying system; an outlet of the feeding system is connected to an inlet of the main pyrolysis reactor system, and an outlet of the main pyrolysis reactor system is connected to the pyrolysis residue conveying system; an upper part of the main pyrolysis reactor system is connected to a pyrolysis gas condensation recovery system and a non-condensable combustible gas reuse system; and the non-condensable combustible gas reuse system is sequentially connected to the combustion heat supply system and a tail gas treatment system.

The invention has the following beneficial effects.

(1) The invention separates the catalysts from the waste organic polymer materials and introduces the composite auxiliary agent for removing harmful elements during the pyrolysis process. As the waste organic polymer materials are subjected to heat, resulting active components first react with the composite auxiliary agent for removing harmful elements, initially immobilizing harmful elements such as sulfur and chlorine into the composite auxiliary agent for removing harmful elements. This step helps to preliminarily regulate pyrolysis gas products, which then react with the catalysts located at the upper part of the pyrolysis reactor. The base plate holding the catalysts is equipped with an auxiliary heating device to maintain the catalysts at their optimal active temperature, further improving the quality of the pyrolysis gas products. Meanwhile, throughout the pyrolysis process, the waste organic polymer materials such as waste rubber and waste plastic and the catalysts move in opposite directions, maximizing the contact time between the catalysts and the gaseous pyrolysis products, thus improving the quality of the pyrolysis products.

(2) The invention separates the waste organic polymer materials such as waste rubber and waste plastic from the catalysts during the pyrolysis process, and separately controls the harmful element removal and catalytic pyrolysis process conditions, allowing sulfur and chlorine compounds in the pyrolysis products to fully react with the composite auxiliary agent for removing harmful elements for neutralization, thereby reducing the sulfur and chlorine content in pyrolysis oil products by over 85%. Through the reverse flow of the waste organic polymer materials, such as waste rubber and waste plastic, relative to the catalysts during pyrolysis, and by regulating the temperature in the catalyst active zone, the intermediate products from the pyrolysis of the waste organic polymer materials such as waste rubber and waste plastic can sufficiently contact the catalysts. This results in increased production of low-carbon olefins and aromatics in the pyrolysis products, significantly enhancing the economic value of the pyrolysis products and driving technological transformation in the pyrolysis industry for the waste organic polymer materials such as waste rubber and waste plastic.

Figure 1:
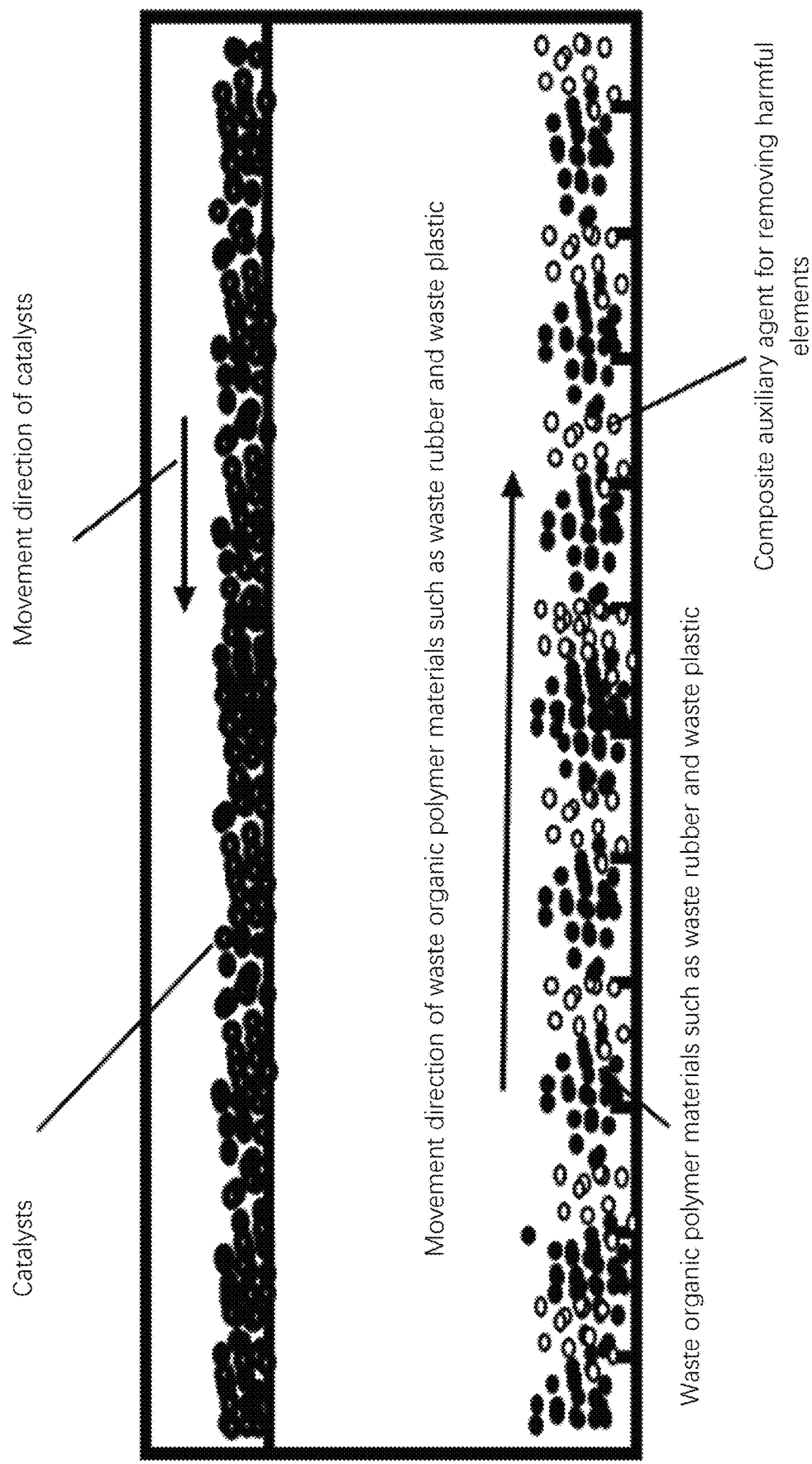
FIG. 1 is a schematic diagram of a method for regulating waste organic polymer material pyrolysis products according to the invention.

In the drawings: I. main pyrolysis reactor system; II. feeding system; III. combustion heat supply system; IV. pyrolysis residue conveying system; 1. catalyst dosing device; 2. pyrolysis furnace sealing device; 3. pyrolysis furnace vessel; 4. drive gear; 5. chain drive system; 6.

catalyst discharge device; 7. screw drive system; 8. screw; 9. base plate; 10. catalyst self-circulating device; 11. sealing rotating ring; 12. sealing gasket; 13. pyrolysis furnace side wall; 14. lubricant port; 15. upper static seal ring; 16. lower static seal ring; 17. electric heating coil.

DETAILED DESCRIPTION OF THE EMBODIMENTS

The technical schemes in the embodiments of the present invention are clearly and completely described in the following with reference to the embodiments and the attached drawings. It is obvious that the described embodiments are only some of the embodiments of the present invention and are not all the embodiments thereof. All other embodiments obtained by those of ordinary skill in the art based on the embodiments of the present invention without inventive effort fall within the scope of the present invention.

Embodiment 1

As shown in FIG. 1, the invention provides a method for regulating waste organic polymer material pyrolysis products. This method involves adding a composite auxiliary agent for removing harmful elements to waste organic polymer materials such as waste rubber and waste plastic during the pyrolysis process, allowing the reaction to occur at any temperature within the range of 400 to 450° C. This enables sulfur and chlorine compounds in intermediate pyrolysis products to fully react with the composite auxiliary agent for removing harmful elements for neutralization, thereby reducing the sulfur and chlorine content in pyrolysis oil products.

Simultaneously, the waste organic polymer materials are separated from catalysts, and the movement directions of the two during the pyrolysis process are controlled to be opposite. The temperature in the catalyst active zone is regulated to maintain the catalysts at the optimal activity temperature, for example, at any temperature within the range of 550 to 800° C. Through the reverse flow of the waste organic polymer materials, such as waste rubber and waste plastic, relative to the catalysts during pyrolysis, the intermediate products from the pyrolysis of the waste organic polymer materials such as waste rubber and waste plastic can sufficiently contact the catalysts, resulting in an increased yield of low-carbon olefins and aromatics in the pyrolysis products.

The catalysts used in the invention are low-cost composite catalysts primarily prepared from waste catalysts from petroleum processing, and the main components are a mixture of refinery waste catalyst, fly ash, and red mud, with a mixing ratio of 60:30:10 for waste rubber pyrolysis and 45:40:15 for waste plastic pyrolysis.

The composite auxiliary agent for removing harmful elements is used to neutralize harmful elements such as sulfur, chlorine, and silicon in the intermediate pyrolysis products, so as to immobilize the harmful elements into the composite auxiliary agent for removing harmful elements. The composite auxiliary agent for removing harmful elements is primarily based on red mud, supplemented with a certain proportion of alkaline substances including calcium oxide, calcium carbonate, dolomite, magnesium oxide, sodium carbonate, and mordenite, along with a certain amount of binder, which are mixed and granulated according to specific weight proportions. The optimal formulations are as follows: 20 parts of red mud, 15 parts of calcium oxide, 10 parts of calcium carbonate, 10 parts of dolomite, 10 parts of magnesium oxide, 15 parts of sodium carbonate, 10 parts of mordenite, and 5 parts of binder; or alternatively: 25 parts of red mud, 20 parts of calcium oxide, 10 parts of calcium carbonate, 5 parts of dolomite, 5 parts of magnesium oxide, 10 parts of sodium carbonate, 15 parts of mordenite, and 5 parts of binder.

Embodiment 2

Figure 2:
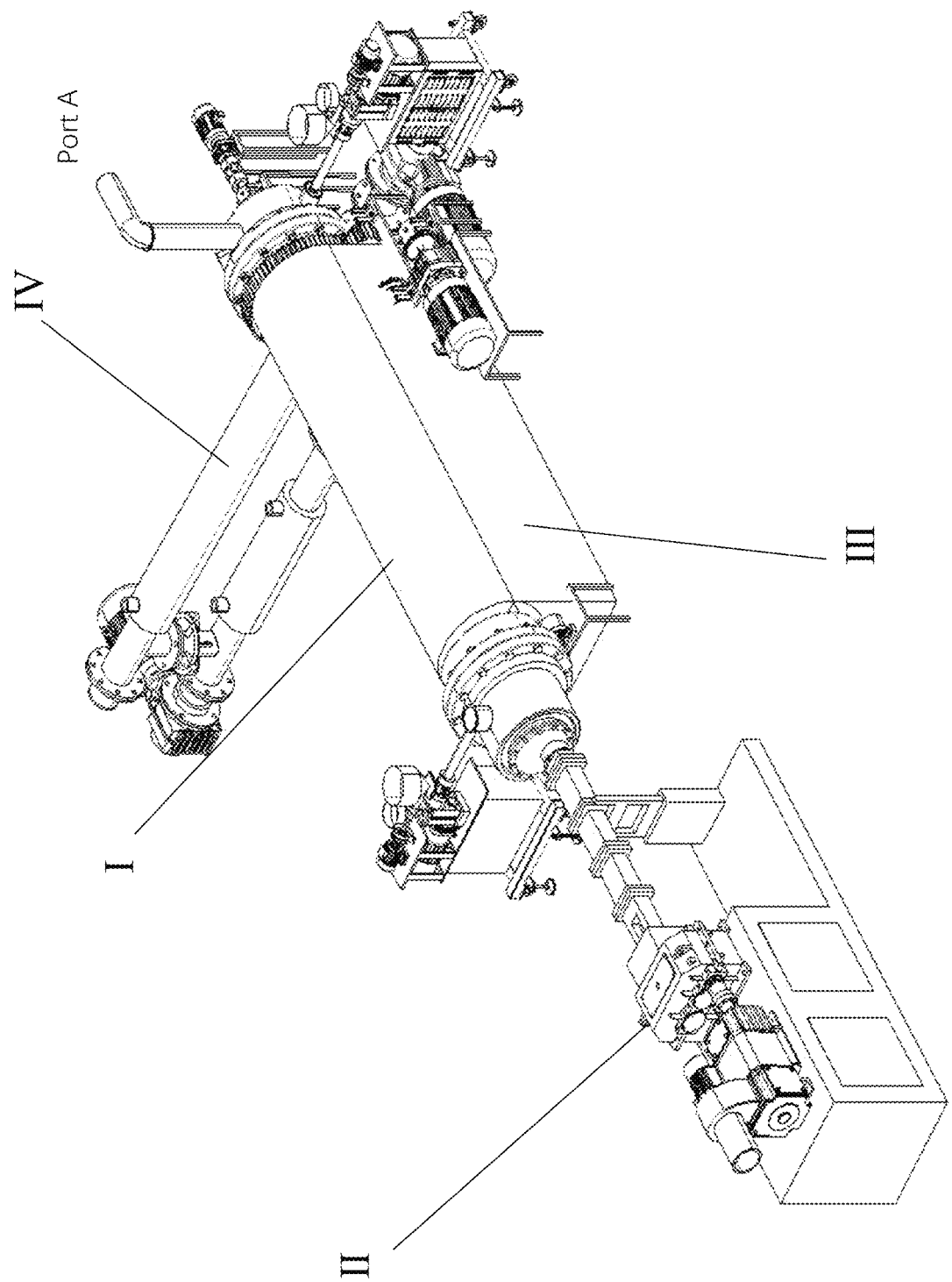
FIG. 2 is a structural diagram of a device for regulating waste organic polymer material pyrolysis products.

As shown in FIG. 2, the invention also provides a device for regulating waste organic polymer material pyrolysis products. The device includes a main pyrolysis reactor system I, a feeding system II, a combustion heat supply system III, and a pyrolysis residue conveying system IV An upper port A of the main pyrolysis reactor system I is connected to a pyrolysis gas condensation recovery system and a non-condensable combustible gas reuse system. The non-condensable combustible gas reuse system is then connected to the combustion heat supply system III, and the combustion heat supply system III is connected to a tail gas treatment system. The connection method for each system in this device is as follows: the main pyrolysis reactor system I is connected to an outlet of the feeding system II via a flange, the upper port A of the main pyrolysis reactor system I is connected to the pyrolysis gas condensation recovery system and the non-condensable combustible gas reuse system, the non-condensable combustible gas reuse system is connected to the combustion heat supply system III, and the combustion heat supply system III is connected to the tail gas treatment system; and the main pyrolysis reactor system I is connected to the pyrolysis residue conveying system IV via a flange at an outlet.

The purpose of the device in the invention is to enhance the economic value of the pyrolysis products of waste organic polymer materials such as waste rubber and waste plastic. The device is designed based on low-cost catalysts, with the main pyrolysis reactor system I being the core of the device. The feeding system II, the combustion heat supply system III, and the pyrolysis residue conveying system IV are structures disclosed in the prior art. For example, the feeding system II is disclosed in Chinese patent CN108518965A, the combustion heat supply system III, the pyrolysis gas condensation recovery system, the non-condensable combustible gas reuse system, and the tail gas treatment system are disclosed in patent CN111303927A, and the pyrolysis residue conveying system IV is disclosed in patent CN108373929A.

Figure 3:
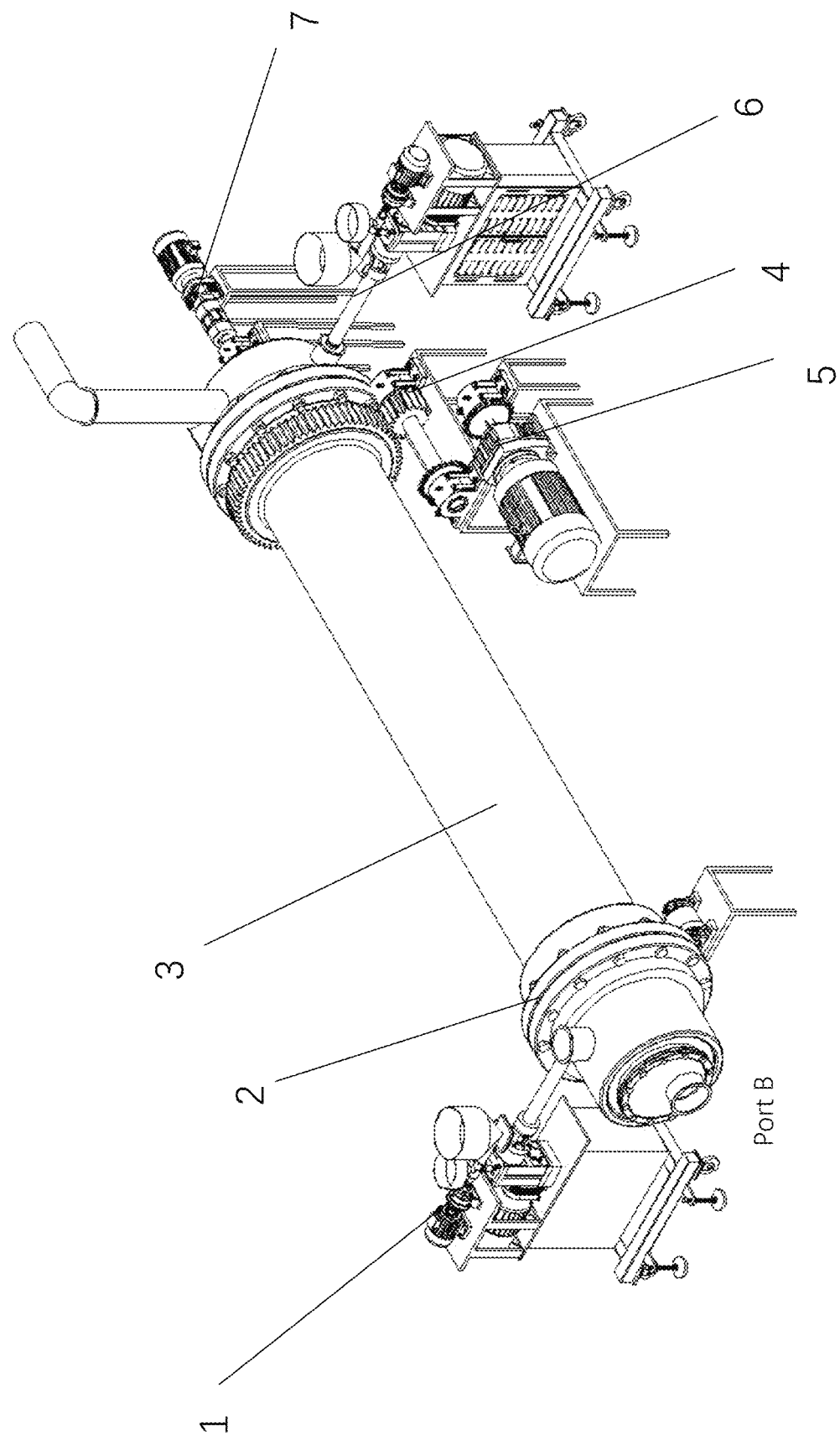
FIG. 3 is a structural diagram of a main pyrolysis reactor system.

The specific structural composition of the main pyrolysis reactor system I is shown in FIG. 3, including a catalyst dosing device 1, pyrolysis furnace sealing devices 2, a pyrolysis furnace vessel 3, a drive gear 4, a chain drive system 5, a catalyst discharge device 6, a screw drive system 7, and a catalyst self-circulating device 10.

Figure 4:
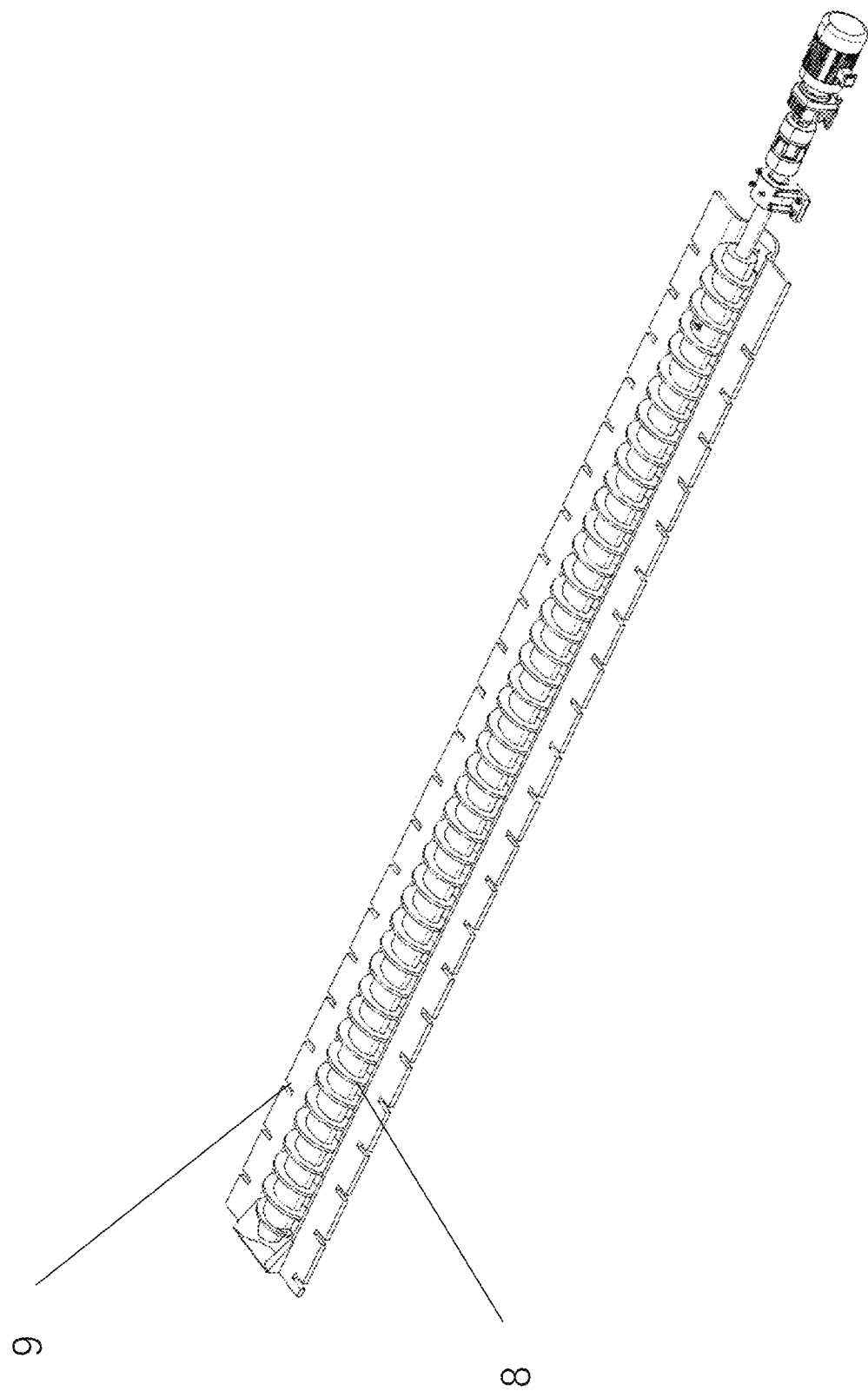
FIG. 4 is a structural diagram of a catalyst self-circulating device.
Figure 5:
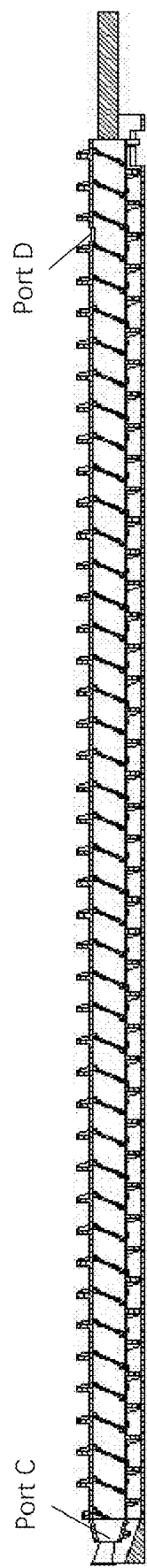
FIG. 5 shows a helical hollow structure of a screw.

The catalyst self-circulating device 10 is installed at the top inside the pyrolysis furnace vessel 3 and is inclined at a certain angle, generally within the range of 3-7°. The catalyst self-circulating device 10 includes a screw 8 and a base plate 9. As shown in FIG. 4, the screw 8 is connected to the screw drive system 7 via a coupling, with the screw drive system 7 positioned below a tail of the screw 8. A central part of the screw 8 is designed as a helical hollow structure, the helical direction of which is opposite to that of an outer surface of the screw 8. A helix angle is 5-10% greater than that of the outer surface of the screw 8 to maintain a similar catalyst transport rate inside and outside. It serves as an internal channel for catalyst delivery. As shown in FIG. 5, port C is a hollow feed inlet, and port D is a hollow discharge outlet.

In a specific embodiment, except for the tail, the screw 8 features spiral ridges of equal thickness from head to tail. However, at the tail, a spiral blade structure is separately welded onto the screw 8, with a thickness that is ⅕-⅓ of the thickness of the spiral ridge. The thinner spiral blades allow for a greater curvature, facilitating the delivery of the catalysts into the hollow interior of the screw 8.

The delivery of the catalysts into the hollow screw 8 is primarily achieved through the special structure of the spiral blades at the tail of the screw 8. At the tail, a shaft of the screw 8 becomes thinner, the spiral blades overall become longer, and the rotational curvature of the spiral blades is 3-4 times that of the conventional spiral ridges at the front end.

In a specific embodiment, the external spiral ridges of the screw 8 cooperate with the base plate 9, and the base plate 9 is welded above the pyrolysis furnace vessel 3. A gap between the external spiral ridges of the screw 8 and the base plate 9 is maintained at 1-3 mm (excluding the tail of the screw 8), with 1 mm being optimal.

In a specific embodiment, during the ex-situ catalytic pyrolysis process of waste organic polymer materials, the catalysts are axially moved by the screw 8 on the porous base plate 9. The size and position of the pore on the base plate 9 are primarily determined based on the movement characteristics of the catalysts under the propulsion of the screw 8. The base plate 9 is inclined at a certain angle, generally within the range of 3-7°, with 5° being optimal. The base plate is installed in a configuration that is higher on the left and lower on the right in an axial direction, ensuring that the catalysts continuously ascend during movement. This design allows the movement of the catalysts to be entirely reliant on the propulsion of the screw 8.

Figure 6:
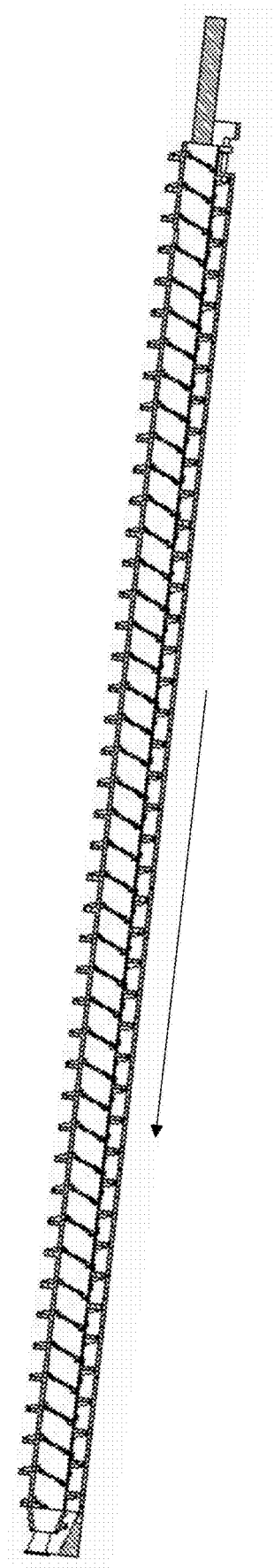
FIG. 6 outlines the direction of catalyst self-circulation.

The device provided by the invention is capable of regulating the self-circulation of the catalysts. The catalysts are repeatedly used within the pyrolysis furnace vessel 3 using a self-circulation method, as shown in FIG. 6, which illustrates the direction of catalyst self-circulation.

According to the self-circulation method for the catalysts, under the action of the screw drive system 7, the screw 8 continuously rotates at a certain speed, moving the catalysts upwards until the catalysts reach the top of the base plate 9. As the catalysts gradually accumulate, the catalysts are scooped into the hollow interior of the screw 8 from the gap between the screw 8 and the base plate 9 by the spiral blades at the tail of the screw 8. The catalysts entering the interior of the screw 8 move downwards to the bottom of the screw 8 at a certain speed under the action of self weight and the spiral ridges inside the screw 8, and flow out from an outlet at a head of the hollow screw 8. This process is repeated to achieve self-circulation of the catalysts during the pyrolysis process.

The entire circulation method relies on a single power source, which is a motor device, the motor drives the screw 8 to rotate, which in turn drives the catalysts to move upwards, and the catalysts are then scooped into the hollow interior of the screw 8 by the spiral blades at the tail of the screw 8, and move downwards under the action of self weight and the spiral ridges inside the screw.

The catalyst dosing device 1 is used to replenish the catalysts. During the pyrolysis process, the catalysts may partially deactivate due to friction transport and the accumulation of harmful substances from the intermediate pyrolysis products, necessitating periodic replenishment. This is achieved through the catalyst dosing device 1 connected to the bottom of the screw 8, which adds the catalysts to the catalyst self-circulating device 10.

Figure 7:
FIG. 7 is a structural diagram of a screw.
Figure 8:
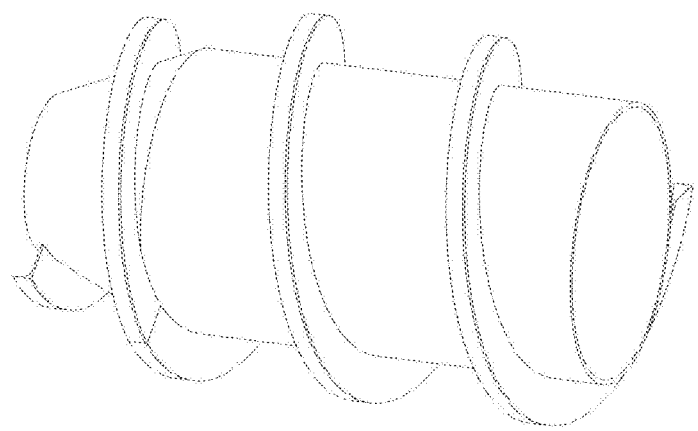
FIG. 8 is an enlarged view of area E (the tail of the screw)

In a specific embodiment, as shown in FIG. 7, the spiral blades in area E (the tail of the screw 8) are upwardly inclined and coordinate with the relative position of the base plate 9, facilitating the automatic flipping of the catalysts into port C. FIG. 8 shows an enlarged view of area E.

It should be noted that a certain number of circular holes with specified diameters are arranged slightly above the center of the base plate 9, and a certain number of rectangular slots are randomly arranged at a horizontal position on the upper part of the base plate 9. The length of the rectangular slots is preferably ⅕-¼ of the width of the base plate 9, and the width is preferably 2-5 mm. The position of the circular holes is determined by the type of the catalysts and the operating speed of the screw 8. The principle for setting the position is that, at a certain operating speed of the screw 8, the maximum height of the catalysts moving on the base plate 9 under the drive of the screw 8 should not reach the lowest position of the circular holes. When the particle size D of the catalysts is less than 10 nm, the size ø of the circular holes is 3-6 mm, and the operating speed of the screw 8 is set to a lower value. When the particle size of the catalyst exceeds 100 nm, the size ø of the circular holes is 5-9 mm, and the operating speed of the screw 8 is set to a lower value.

Figure 9:
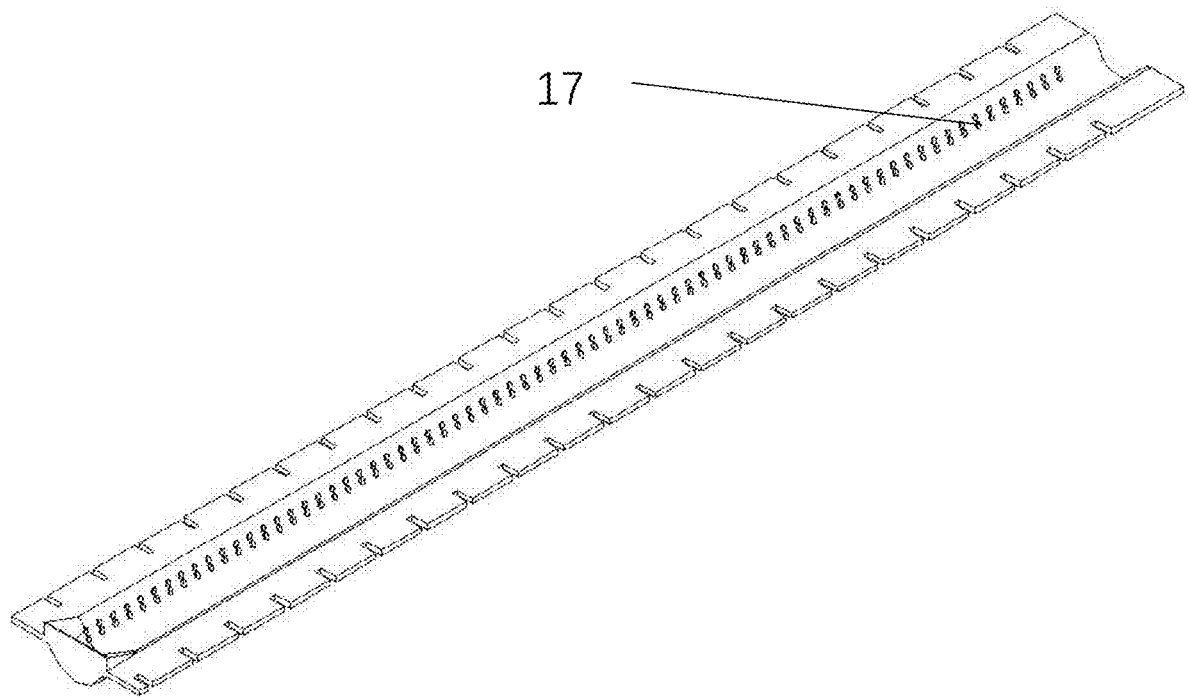
FIG. 9 presents a base plate with electric heating coils installed at the bottom.

As shown in FIG. 9, electric heating coils 17 are installed in a non-perforated area beneath the base plate 9. The electric heating coils can provide real-time auxiliary heating to the base plate 9 based on temperature changes within the pyrolysis reactor, ensuring that the catalysts remain at the optimal pyrolysis temperature. The separate control of the harmful element removal and catalytic pyrolysis process conditions is primarily based on controlling the pyrolysis temperature to regulate the maximum reaction activity of the composite auxiliary agent for removing harmful elements and the catalysts. The temperature for the harmful element removal process is controlled by a pyrolysis reactor heat supply device. The catalytic pyrolysis process is based on the internal temperature of the pyrolysis reactor, utilizing an electric heating auxiliary temperature control system (composed mainly of the electric heating coils 17) located at the bottom of the base plate 9, ensuring that catalytic pyrolysis occurs at the best temperature.

Further, the main pyrolysis reactor system also includes a drive gear 4, a chain drive system 5, and a catalyst discharge device 6; the chain drive system 5 drives the drive gear 4, which then transfers power to the pyrolysis furnace vessel 3 to enable the same to rotate at a constant speed; the pyrolysis furnace sealing devices 2 are installed at both ends of the pyrolysis furnace vessel 3 and are used to keep the rotating pyrolysis furnace vessel 3 sealed; and the catalyst discharge device 6 is connected to the pyrolysis furnace vessel 3 and is used to discharge the catalysts.

Figure 10:
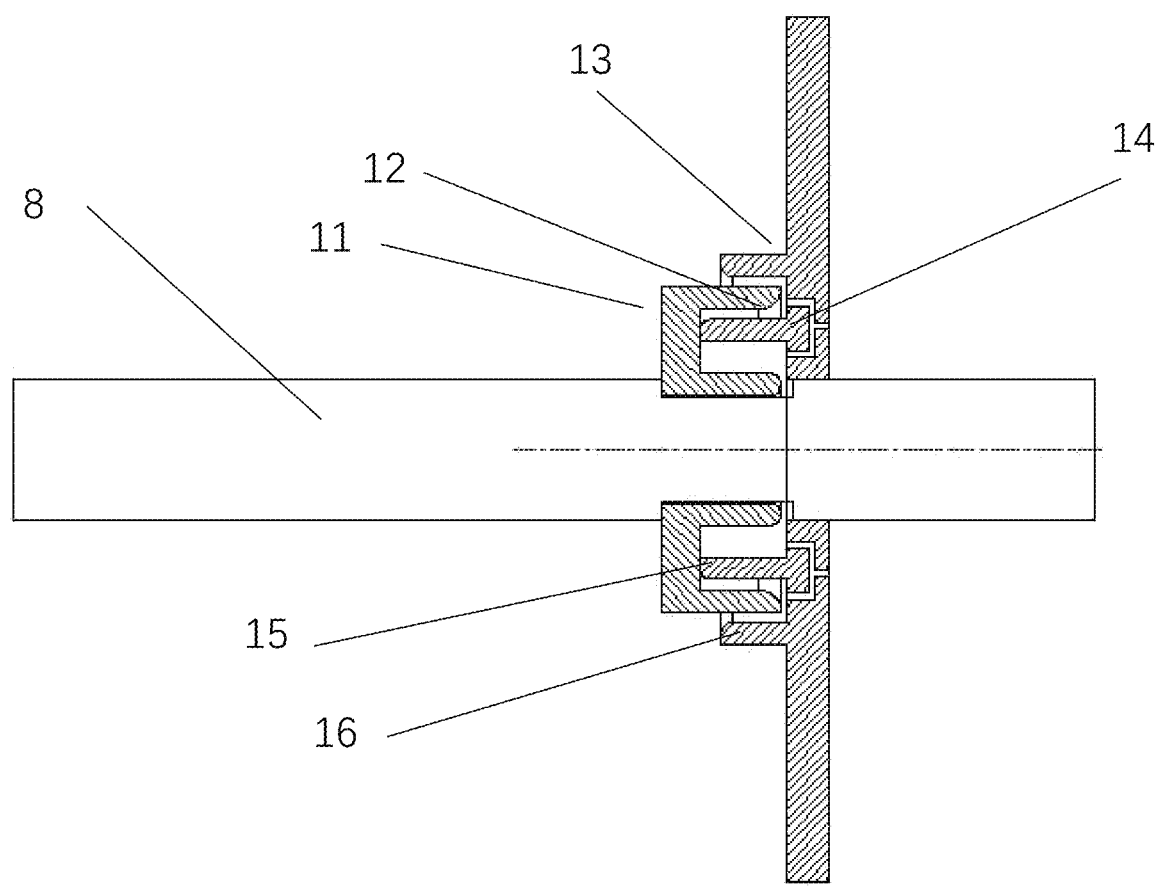
FIG. 10 is a structural diagram of a pyrolysis furnace sealing device.

As shown in FIG. 10, the pyrolysis furnace sealing device 2 includes a sealing rotating ring 11, a sealing gasket 12, a pyrolysis furnace side wall 13, a lubricant port 14, an upper static sealing ring 15, and a lower static sealing ring 16. The sealing rotating ring 11 is of a U-shaped structure, which is interference-fitted to the corresponding part of the screw 8, and a sealing working plane of the sealing rotating ring 11 protrudes 1-2 mm beyond a working surface of the screw 8. Two circular rings are welded to a portion of the pyrolysis furnace side wall 13 that fits with the sealing rotating ring 11, forming static sealing rings (namely, the upper static sealing ring 15 and the lower static sealing ring 16), with the upper static sealing ring 15 being 10 mm longer than the lower static sealing ring 16. The sealing gasket 12 is located in a sealing working area between the sealing rotating ring 11 and the upper and lower static sealing rings 15, 16. The lubricant port 14 introduces a lubricant to lubricate the sealing working area.

Embodiment 3

This embodiment provides a method for regulating pyrolysis products from industrial continuous pyrolysis of waste organic polymer materials by using a regulation device provided by the invention. A mixture of waste organic polymer materials and a composite auxiliary agent for removing harmful elements is conveyed separately from catalysts into the device, where a layered arrangement is adopted, with the catalysts on top. The catalysts are axially moved by a screw 8 on a porous and inclined base plate 9. The mixture of the waste organic polymer materials and the composite auxiliary agent for removing harmful elements is located in the lower layer and is axially moved by a spiral structure at the bottom of a pyrolysis reactor. The materials in the upper and lower layers are made to move in opposite directions.

The specific process flow for the regulation method is as follows.

The waste organic polymer materials such as waste rubber and waste plastic and the composite auxiliary agent for removing harmful elements enter a pyrolysis furnace vessel 3 of a main pyrolysis reactor system I under the action of a feeding system II. The pyrolysis reactor drives a chain drive system 5 through a motor reducer and then drives a drive gear 4, which then transfers power to the pyrolysis furnace vessel 3 to enable the same to rotate at a constant speed. The rotating pyrolysis furnace vessel 3 remains sealed under the action of pyrolysis furnace sealing devices 2. The temperature of the main pyrolysis reactor system I is maintained between 400° C. and 450° C. by a combustion heat supply system III, causing molecular chains of the waste organic polymer materials to break and produce active components. These components initially react with the composite auxiliary agent for removing harmful elements, causing sulfur, chlorine, and other harmful components in the products to be immobilized into pyrolysis solid-phase products. The active components that have undergone preliminary reactions then come into contact with the catalysts and undergo catalytic reactions, further regulating the quality of the pyrolysis products.

The catalysts are quantitatively fed into a catalyst self-circulating device 10 at regular intervals by a catalyst dosing device 1. Under the action of a screw drive system 7, the screw 8 is kept moving at a constant speed, driving the catalysts to move upwards at a certain speed until the catalysts reach the top of the base plate 9. The catalysts gradually accumulate, and under the unique spiral ridge structure in the area E of the screw 8, the catalysts are scooped into the screw 8 from a gap between the screw 8 and the base plate 9. The catalysts entering the interior of the screw 8 are then conveyed at a constant speed to the bottom of the screw 8 under the action of the internal spiral ridges and self weight, and flow out from an outlet at a head of the hollow screw 8. This process is repeated to achieve self-circulation of the catalysts during the pyrolysis process. Moreover, during the catalyst self-circulation process, in order to effectively control the pyrolysis products, based on the temperature of the pyrolysis reactor, the temperature of the catalyst self-circulating system is adjusted by controlling an electric heating system of the base plate 9, so that the catalysts are always at the optimal temperature during the pyrolysis process, thereby improving the quality of the pyrolysis products.

The catalysts, after a period of use, experience a decrease in activity and thus require periodic replenishment. The catalysts are added into the catalyst self-circulating device 10 through the catalyst dosing device 1 at the bottom of the screw 8. When the catalysts in the catalyst self-circulating device 10 reach 40% of its total volume, all the catalysts need to be discharged through a catalyst discharge device 6, and then new catalysts are added through the catalyst dosing device 1.

After reacting with the composite auxiliary agent for removing harmful elements and the catalysts, gaseous pyrolysis products pass through port A and enter a pyrolysis gas condensation recovery system for settlement and cooling to form pyrolysis oil products. Uncondensed pyrolysis gas continues to enter a non-condensable combustible gas reuse system, which is connected to a combustion heat supply system III to provide energy for the pyrolysis reaction. Pyrolysis residues generated from the pyrolysis of waste organic polymer materials enter a pyrolysis residue conveying system IV through a flange at an outlet of the main pyrolysis reactor system I. Flue gas generated after combustion is treated by a tail gas treatment system and then discharged after meeting emission standards.

Test Example 1

Systematic experimental research on waste tire pyrolysis was conducted using the regulation device of the invention, and a comparative analysis was performed with traditional pyrolysis methods (rotary kiln-type pyrolysis reactor, with pyrolysis temperature controlled at 500° C.). The specific results are as follows:

Experimental material: Waste passenger car tires, crushed into square blocks of about 15 cm.

Experimental Data (1) Material Balance Experimental Data

TABLE 1

| Material Balance of Mixed Waste Plastic Pyrolysis | | |
|---|---|---|
| Item | Traditional pyrolysis | The method of the invention |
| Waste rubber (Kg) | 820 | 857 |
| Oil products (Kg) | 280 | 305 |
| Steel wires (Kg) | 80 | 85 |
| Residues (Kg) | 369 | 390 |
| Gas (Kg) | 91 | 77 |

The pyrolysis product regulation method provided by this invention can significantly increase the yield of pyrolysis oil products while reducing the yield of pyrolysis gas, thereby greatly enhancing the economic benefits and production safety of pyrolysis enterprises.

(2) Analysis of Pyrolysis Oil Product Properties

TABLE 2

Analysis of Oil Product Properties

| Item | Traditional pyrolysis | The method of the invention |
|---|---|---|
| Closed-cup flash point ° C. | 42° C. | 55° C. |
| Kinematic viscosity (40° C.)mm2/s | 2.008 | 2.871 |
| Density (20° C.)g/cm3 | 0.9993 | 0.8755 |
| Sulphur content mg/kg | 874 | 251 |
| Distillation range | | |
| Initial boiling point/° C. | 162 | 142 |
| 5% Recovery temperature/° C. | 225 | 203 |
| 10% Recovery temperature/° C. | 238 | 233 |
| 20% Recovery temperature/° C. | 278 | 259 |
| 30% Recovery temperature/° C. | 338 | 324 |
| 40% Recovery temperature/° C. | 372 | 356 |
| 50% Recovery temperature/° C. | 399 | 381 |
| 60% Recovery temperature/° C. | 436 | 400 |
| 70% Recovery temperature/° C. | 469 | 445 |
| 80% Recovery temperature/° C. | 532 | 470 |
| 90% Recovery temperature/° C. | 582 | 520 |

Based on the above experimental data, the pyrolysis product regulation method of this invention results in a closed-cup flash point and kinematic viscosity of pyrolysis oil products that are higher than those obtained by traditional pyrolysis methods. Additionally, the oil density is lower than that achieved with traditional methods, and the recovery temperatures during distillation are also lower, indicating a significant increase in light components of the oil products and a notable improvement in oil quality.

(3) Content of Valuable Substances in Pyrolysis Oil Products

TABLE 3

Analysis of Content of Valuable Substances in Oil Products

| | Benzene | Methyl-benzene | Ethyl-benzene | Xylene | Total quantity | Yield increase rate |
|---|---|---|---|---|---|---|
| Traditional pryolysis | 0.1 | 1.18 | 0.5 | 2.18 | 3.96 | 198.23% |
| The method of the invention | 0.55 | 4.49 | 1.21 | 5.56 | 11.81 | |

TABLE 4

Pyrolysis Residue Data Analysis

| | Ash content (dry basis) % | Sulfur content (dry basis) % | (dry Higher heating value (dry basis) MJ/kg |
|---|---|---|---|
| Traditional pyrolysis | 53.92 | 0.59% | 20.87 |
| The method of the invention | 54.68 | 0.57% | 14.45 |

Based on the above experimental data, it can be seen that the higher heating value of the residues after pyrolysis using the method of the invention is significantly reduced, indicating a more complete pyrolysis process. Additionally, the content of harmful elements in the pyrolysis residues is noticeably lower.

In summary, the device and method of this invention can significantly enhance the pyrolysis efficiency of mixed waste plastic, leading to a significant increase in both the yield and quality of the pyrolysis oil products, while making the entire pyrolysis process more thorough.

Test Example 2

Systematic experimental research on waste plastic pyrolysis was conducted using the device of the invention, and a comparative analysis was performed with traditional pyrolysis methods (rotary kiln-type pyrolysis reactor, with pyrolysis temperature controlled at 500° C.). The specific results are as follows:

Experimental material: Waste plastic from paper mills

Experimental Data (1) Material Balance Experimental Data

TABLE 5

Material Balance of Mixed Waste Plastic Pyrolysis

| Item | | Traditional pyrolysis | The method of the invention |
|---|---|---|---|
| Waste plastic (Kg) | | 820 | 850 |
| Oil products (Kg) | Light oil (Kg) | 200 | 147.5 |
| | Wax oil (Kg) | 320 | 477.5 |
| Residues (Kg) | | 25 | 30 |
| Gas (Kg) | | 275 | 197 |

The method provided by the invention can significantly increase the yield of pyrolysis oil products, facilitating the conversion of mixed waste plastic into liquid products, while reducing the yield of pyrolysis gas, thereby greatly enhancing the economic benefits and production safety of pyrolysis enterprises.

(2) Analysis of Pyrolysis Oil Product Properties

TABLE 6

Analysis of Oil Product Properties

| Item | Traditional pyrolysis | The method of the invention |
|---|---|---|
| Closed-cup flash point ° C. | 25° C. | 35° C. |
| Kinematic viscosity (40° C.) mm$^2$/s | 2.186 | 2.651 |
| Density (20° C.)g/cm3 | 0.9783 | 0.8255 |
| Chlorine content mg/kg | 564 | 267 |
| Distillation range | | |
| Initial boiling point/° C. | 152 | 149 |
| 5% Recovery temperature/° C. | 235 | 223 |
| 10% Recovery temperature/° C. | 235 | 227 |
| 20% Recovery temperature/° C. | 298 | 276 |
| 30% Recovery temperature/° C. | 358 | 312 |
| 40% Recovery temperature/° C. | 382 | 356 |
| 50% Recovery temperature/° C. | 409 | 389 |
| 60% Recovery temperature/° C. | 426 | 412 |
| 70% Recovery temperature/° C. | 479 | 445 |
| 80% Recovery temperature/° C. | 538 | 480 |
| 90% Recovery temperature/° C. | 580 | 520 |

Based on the above experimental data, the method of the invention results in a closed-cup flash point and kinematic viscosity of pyrolysis oil products that are higher than those obtained by traditional pyrolysis methods. Additionally, the oil density is lower than that achieved with traditional methods, and the recovery temperatures during distillation are also lower, indicating a significant increase in light components of the oil products and a notable improvement in oil quality.

(3) Content of Valuable Substances in Pyrolysis Oil Products

TABLE 7

Analysis of Content of Valuable Substances in Oil Products

|  | Benzene | Methyl-benzene | Ethyl-benzene | Xylene | Total quantity | Yield increase rate |
|---|---|---|---|---|---|---|
| Traditional pyrolysis | 0.81 | 9.91 | 8.33 | 6.86 | 25.91 | 32.69% |
| The method of the invention | 1.77 | 13.08 | 11.78 | 7.75 | 34.38 | |

TABLE 8

Pyrolysis Residue Data Analysis

|  | Ash content (dry basis) % | (dry Sulfur content basis) % | (dry Higher heating value (dry basis) MJ/kg |
|---|---|---|---|
| Traditional pyrolysis | 51.92 | 0.59% | 20.87 |
| The method of the invention | 52.68 | 0.49% | 15.45 |

Based on the above experimental data, it can be seen that the higher heating value of the residues after pyrolysis using the of the invention is significantly reduced, indicating a more complete pyrolysis process. Additionally, the content of harmful elements in the pyrolysis residues is noticeably lower.

In summary, the device and method of this invention can significantly enhance the pyrolysis efficiency of mixed waste plastic, leading to a significant increase in both the yield and quality of the pyrolysis oil products, while making the entire pyrolysis process more thorough.

The above description merely represents preferred embodiments of the invention and is not intended to limit the invention. Although the invention has been described in detail with reference to the aforementioned embodiments, those skilled in the art may still modify the technical schemes described in the aforementioned embodiments or replace some of the technical features with equivalent ones. Any modification, equivalent substitution, improvement, etc. made within the spirit and principle of the invention should be included in the protection scope of the invention.

What is claimed is:

1. A method for regulating a waste organic polymer material pyrolysis product, comprising the following steps:
   (1) uniformly mixing a waste organic polymer material with a composite auxiliary agent for removing a harmful element in a waste organic polymer material to composite auxiliary agent mass ratio of 90:10 to obtain a mixture;
   (2) conducting a layered arrangement with a catalyst in an upper layer of a pyrolysis reactor and the mixture of the waste organic polymer material and the composite auxiliary agent in a lower layer of the pyrolysis reactor, ensuring that materials in the upper layer and the lower layer move in opposite directions to maintain a countercurrent flow; and
   (3) conducting a pyrolysis process in the pyrolysis reactor by placing the mixture of the waste organic polymer material and the composite auxiliary agent in the lower layer of the pyrolysis reactor under a waste organic polymer material pyrolysis temperature of 400-450° C. allowing the waste organic polymer material to decompose into a primary pyrolysis product, thereafter allowing the primary pyrolysis product, after reacting with the composite auxiliary agent for removing the harmful element, being transported to the upper layer of the pyrolysis reactor to fully contact the catalyst, and placing under a product regulation temperature of 550-800° C. in the upper layer of the pyrolysis reactor, resulting in a final pyrolysis product comprising aromatics;
   wherein the catalyst is one or a mixture selected from a refinery waste catalyst, a fly ash, and a red mud, and the composite auxiliary agent for removing the harmful element is an alkaline component comprising the red mud.

2. The method according to claim 1, wherein the catalyst and the mixture of the waste organic polymer material and the composite auxiliary agent for removing the harmful element are placed in the pyrolysis reactor in the layered arrangement, and a movement direction is controlled to ensure that the catalyst in the upper layer and the mixture of the waste organic polymer material and the composite auxiliary agent for removing the harmful element in the lower layer move in the opposite directions during the pyrolysis process, enabling an ex-situ catalytic pyrolysis of the primary pyrolysis product in the upper layer of the pyrolysis reactor; and
   wherein the waste organic polymer material comprises a waste rubber or a waste plastic; when the waste organic polymer material is the waste rubber, a mass ratio of the refinery waste catalyst, the fly ash, and the red mud is 60:30:10; and when the waste organic polymer material is the waste plastic, the mass ratio of the refinery waste catalyst, the fly ash, and the red mud is 45:40:15.

3. The method according to claim 1, wherein during the pyrolysis process, the harmful element in the waste organic polymer material reacts with the composite auxiliary agent for removing the harmful element, leading to an immobilization of the harmful element into the composite auxiliary agent for removing the harmful element, and the harmful element comprises sulfur, chlorine, and silicon;
   wherein the composite auxiliary agent for removing the harmful element further comprises an alkaline substance and a binder, and the alkaline substance comprises calcium oxide, calcium carbonate, dolomite, magnesium oxide, sodium carbonate, and mordenite; and
   wherein the composite auxiliary agent for removing the harmful element is prepared through a mixing and a granulation of the following components by weight: 20-25 parts of the red mud, 15-20 parts of the calcium oxide, 10 parts of the calcium carbonate, 5-10 parts of the dolomite, 5-10 parts of the magnesium oxide, 10-15 parts of the sodium carbonate, 10-15 parts of the mordenite, and 5 parts of the binder.

4. A device for implementing the method for regulating a waste organic polymer material pyrolysis product recited in claim 1, comprising a main pyrolysis reactor system, wherein the main pyrolysis reactor system comprises a catalyst dosing device, a pyrolysis furnace vessel, and a catalyst self-circulating device arranged inside the pyrolysis furnace vessel in an inclined manner; the catalyst self-circulating device comprises a screw, a base plate, and a screw drive system, and an electric heating coil is installed at a bottom of the base plate; and the screw features a hollow interior, with spiral configurations on both an inner surface and an outer surface, wherein the spiral configurations on both the inner surface and the outer surface are oriented in opposite directions, and a spiral angle on the inner surface is 5%-10% greater than a spiral angle on the outer surface.

5. The device according to claim 4, wherein a tail of the screw is a spiral blade structure, while a rest of the screw is a spiral ridge structure; a thickness of the spiral blade structure is ⅕-⅓ of a thickness of the spiral ridge structure, and a rotational curvature of the spiral blade structure is 3-4 times a rotational curvature of the spiral ridge structure; a gap between the spiral ridge structure and the base plate is 1-3 mm, and an inclination angle of the base plate is 3-7° with respect to a horizontal axial direction; and the base plate is fixedly installed inside the pyrolysis furnace vessel in a configuration being higher on a left and lower on a right in an axial direction.

6. The device according to claim 5, wherein the catalyst is used repeatedly through the catalyst self-circulating device, with steps as follows: the catalyst input through the catalyst dosing device moves upwards under a driving force of the screw until the catalyst reaches a top of the base plate; as the catalyst gradually accumulates, the catalyst is scooped into the hollow interior of the screw by the spiral blade structure at the tail of the screw; under an action of a self weight and the spiral ridge structure inside the screw, the catalyst moves downwards to the bottom of the base plate at a predetermined speed and flows out from an outlet at a head of the screw with the hollow interior; the steps of operating the catalyst self-circulating device are repeated to achieve a self-circulation of the catalyst during the pyrolysis process; and wherein the catalyst self-circulating device has only one power source, wherein the only one power source is a motor device, the motor device drives the screw to rotate, the screw in turn drives the catalyst to move upwards, and the catalyst is then scooped into the hollow interior of the screw by the spiral blade structure at the tail of the screw, and moves downwards under the action of the self weight and the spiral ridge structure inside the screw.

7. The device according to claim 4, wherein the main pyrolysis reactor system comprises pyrolysis furnace sealing devices, a drive gear, a chain drive system, and a catalyst discharge device; the chain drive system drives the drive gear, the drive gear then transfers a power to the pyrolysis furnace vessel to enable the pyrolysis furnace vessel to rotate at a constant speed; the pyrolysis furnace sealing devices are installed at both ends of the pyrolysis furnace vessel and are configured to keep a rotating pyrolysis furnace vessel sealed; and the catalyst discharge device is connected to the pyrolysis furnace vessel and is configured to discharge the catalyst.

8. The device according to claim 4, wherein a center of the base plate is concave, forming a groove structure; a plurality of circular holes are formed in an upper part of an inner side wall of the groove structure; when a particle size of the catalyst is less than 10 nm, a size of each of the plurality of circular holes is 3-6 mm; when the particle size of the catalyst is greater than 1 00 nm, the size of each of the plurality of circular holes is 5-9 mm; and wherein two sides of the base plate are flat structures, and rectangular slots are formed in the flat structures; and a length of each of the rectangular slots is ⅕-¼ of a width of the base plate, and a width of each of the rectangular slots is 2-5 mm.

9. The device according to claim 7, wherein each of the pyrolysis furnace sealing devices comprises a pyrolysis furnace side wall and a U-shaped sealing rotating ring; the U-shaped sealing rotating ring is interference-fitted with the screw, and a sealing working plane of the U-shaped sealing rotating ring protrudes 1-2 mm beyond a working surface of the screw; a portion of the pyrolysis furnace side wall fitting with the U-shaped sealing rotating ring is equipped with an upper static seal ring and a lower static seal ring, and both the upper static seal ring and the lower static seal ring are circular; the upper static seal ring is 10 mm longer than the lower static seal ring; a sealing gasket is provided between the U-shaped sealing rotating ring and the upper and lower static seal rings; and each of the pyrolysis furnace sealing devices further comprises a lubricant port.

10. The device according to claim 4, further comprising a feeding system, a combustion heat supply system, and a pyrolysis residue conveying system; wherein an outlet of the feeding system is connected to an inlet of the main pyrolysis reactor system, and an outlet of the main pyrolysis reactor system is connected to the pyrolysis residue conveying system, an upper part of the main pyrolysis reactor system is connected to a pyrolysis gas condensation recovery system and a non-condensable combustible gas reuse system; and the non-condensable combustible gas reuse system is sequentially connected to the combustion heat supply system and a tail gas treatment system.

11. The device according to claim 4, when the device is used to implement the method, the catalyst and the mixture of the waste organic polymer material and the composite auxiliary agent for removing the harmful element are placed in a pyrolysis reactor in the layered arrangement, and a movement direction is controlled to ensure that the catalyst in the upper layer and the mixture of the waste organic polymer material and the composite auxiliary agent for removing the harmful element in the lower layer move in the opposite directions during a pyrolysis process, enabling an ex-situ catalytic pyrolysis;

wherein the waste organic polymer material comprises a waste rubber and a waste plastic; when the waste organic polymer material is the waste rubber, a mass ratio of the refinery waste catalyst, the fly ash, and the red mud is 60:30:10; and when the waste organic polymer material is the waste plastic, the mass ratio of the refinery waste catalyst, the fly ash, and the red mud is 45:40:15.

12. The device according to claim 4, when the device is used to implement the method, during the pyrolysis process, the harmful element in the waste organic polymer material reacts with the composite auxiliary agent for removing the harmful element, leading to an immobilization of the harmful element into the composite auxiliary agent for removing the harmful element, and the harmful element comprises sulfur, chlorine, and silicon;

wherein the composite auxiliary agent for removing the harmful element further comprises an alkaline substance and a binder, and the alkaline substance comprises calcium oxide, calcium carbonate, dolomite, magnesium oxide, sodium carbonate, and mordenite; and wherein the composite auxiliary agent for removing the harmful element is prepared through a mixing and a granulation of the following components by weight: 20-25 parts of the red mud, 15-20 parts of the calcium oxide, 10 parts of the calcium carbonate, 5-10 parts of the dolomite, 5-10 parts of the magnesium oxide, 10-15 parts of the sodium carbonate, 10-15 parts of the mordenite, and 5 parts of the binder.

\* \* \* \* \*